United States Patent
Park

(10) Patent No.: US 7,234,057 B2
(45) Date of Patent: Jun. 19, 2007

(54) METHOD FOR PROCESSING ACCESS-REQUEST MESSAGE FOR PACKET SERVICE

(75) Inventor: Sung-Kyun Park, Seoul (KR)

(73) Assignee: LG-Nortel Co., Ltd., Seoul (KR)

(*) Notice: Subject to any disclaimer, the term of this patent is extended or adjusted under 35 U.S.C. 154(b) by 969 days.

(21) Appl. No.: 09/934,477

(22) Filed: Aug. 23, 2001

(65) Prior Publication Data

US 2002/0026573 A1 Feb. 28, 2002

(30) Foreign Application Priority Data

Aug. 28, 2000 (KR) ............... 2000-50068

(51) Int. Cl.
*H04L 29/00* (2006.01)
(52) U.S. Cl. .......................... 713/155; 726/4
(58) Field of Classification Search ................ 380/247, 380/248, 249; 713/183, 202
See application file for complete search history.

(56) References Cited

U.S. PATENT DOCUMENTS 6,088,799 A * 7/2000 Morgan et al. ............. 713/182
6,282,193 B1 * 8/2001 Hluchyj et al. ............. 370/356
6,538,996 B1 * 3/2003 West et al. ................. 370/238

OTHER PUBLICATIONS

RFC 2139—www.faqs.org/rfcs/rfc2139.html.*
RFC 2138—www.faqs.org/rfcs/rfc2138.html.*
Rich Friedeman "Shared Secret Recovery in RADIUS" (fwd) Jul. 18, 1997.*

* cited by examiner

*Primary Examiner*—Kambiz Zand
*Assistant Examiner*—Andrew L. Nalven
(74) *Attorney, Agent, or Firm*—Ked & Associates, LLP

(57) ABSTRACT

A method for processing an access-request message in an IMT-2000 system is described. A user password is encrypted by a temporary authenticator value and an authenticator value which is able to verify an access-request message itself is generated, so that when an AAA server receives the access-request message, it can directly verify the access-request message without analyzing the received access-request message. Thus, even if a malicious hacker transmits a large quantity of false access-request message to the AAA server, the use of the system resource and the message processing time are reduced, so that the system is prevented from crashing.

21 Claims, 6 Drawing Sheets

METHOD FOR PROCESSING ACCESS-REQUEST MESSAGE FOR PACKET SERVICE

BACKGROUND OF THE INVENTION

1. Field of the Invention

The present invention relates to a communication system, and more particularly to a method for processing an access-request message to authenticate a subscriber for a packet service in an IMT-2000 system.

2. Background of the Related Art

In an IMT-2000 system, packet service is provided by performing authentication, authorization to access, and billing. The packet service is thus kept secure.

In the IMT-2000 system, an Authentication, Authorization and Accounting (AAA) server performs the authentication, access authorization, and billing for an account. A Foreign Agent (FA) requests AAA service from the AAA server and provides a packet service for a subscriber to be authenticated by the AAA server. Transmission and reception between the AAA server and the FA is typically performed using a Remote Authentication Dial In User Service (RADIUS) protocol.

The RADIUS protocol is a client/server protocol by which the AAA server authenticates users who request a connection through a dial up modem and communicate with a central server for authorization of user access for a requested system or a service. The RADIUS protocol maintains user information in a central database so that every remote area server may hold the information of the database in common.

FIG. 1 is a flow chart illustrating the transmission and reception of a RADIUS protocol message between the FA and the AAA server in a related art IMT-2000 system. As shown in FIG. 1, the RADIUS protocol has an authentication message, an authorization message and an account message.

The authentication message is used to authenticate a user when the user logs on to an individual network or a public network including the Internet, for which a password is typically required.

The authorization message is used to determine who is authorized to access a corresponding system in a multi-user computer system. It also indicates use authorization, such as an access range of a file, an allowed access time, or an allocated storage space.

The authentication message and the authorization message include an access-request message for requesting access to a network of a terminal, an access-accept message for accepting the access to the network of the terminal, an access-reject message for rejecting the access to the network of the terminal, and an access-challenge message for requesting a challenge for the terminal.

The account message is used to indicate the initialization of a packet service, a time and amount of the packet service to be provided, or the termination of the packet service. The account message includes an account-request message for requesting generation of billing information and an account-response message for accepting generation of billing information.

FIG. 2 shows a format of the RADIUS message. As shown in FIG. 2, the message contains a code field, an identifier field, a length field, an authentication field, and an attribute field. The code indicates a type of a message, and is 1 byte in size. The identifier identifies messages by sessions, and is 1 byte in size. The length indicates the overall length of a message, including the code, the identifier, and the length of the length field. An authenticator is a value used for authentication, and is of 16 bytes in size. An attribute indicates an attribute of a main data.

The RADIUS protocol message has an authenticator field for authenticating the value of the authenticator is a value that the FA produces arbitrarily. This value is not to be repeated; a value that has been used beforehand should not be used again. The reason why the authenticator is used as an arbitrary value is to prevent a hacker from stealing a message for malicious purposes. If the authenticator were fixed according to a message, a hacker could get a normal access-accept message from the AAA server by using the authenticator of a message produced on the basis of the commonly held secret key even though the hacker is not privy to the value of the shared secret key. Thus, the authenticator value needs to be changed every time a message is generated, thereby preventing the hacker from attacking.

A related art method for processing the AAA to provide the packet service in the IMT-2000 system will now be described.

As shown in FIG. 1, when the FA 1 transmits the access-request message for requesting an access to the AAA server 2 (S1), the AAA server 2 analyzes the access-request message to perform user authentication. If the user is successfully authenticated, the AAA server 2 transmits the access-accept message to the FA 1 (S2). When the access-accept message is transmitted, a connection is established. When packet data is transmitted and received, the FA 1 transmits an account billing request message for billing to the AAA server 2 (S3). The AAA server 2 then verifies the received account billing request message. If the account billing request is verified, the AAA server 2 transmits an account billing accept message to the FA 1 (S4).

FIG. 3 is a flow chart illustrating a related art method for generating an access-request message in the FA of the IMT-2000 system. As shown in FIG. 3, the FA 1 generates an arbitrary 16 byte value to use as an authenticator (S11). The FA 1 next encrypts a user password by using the generated authenticator, a user password, and a secret key held in common by itself and the AAA server 2 (S12). It then writes the encrypted user password in the attribute field to generate a an access-request message (S13) and transmits the access-request message to the AAA server 2 (S14).

FIG. 4 is a flow chart illustrating a related art method for processing the access-request message received from the AAA server of the packet system. As shown in the drawing, the AAA server 2 decodes the received access-request message (S21). In order to decrypt the encrypted user password, the AAA server 2 inputs the authenticator value included in the decoded access-request message, the secret key held in common by the FA 1 and the AAA server 2, and the encrypted user password to an MD5 (Message Digest: encrypting/decrypting algorithm), and executes the MD5 algorithm, thereby decrypting the user password (S22).

The AAA server 2 next compares the decrypted user password and a user password of a corresponding user stored in the database (S23) and performs user authentication. Upon comparison, if the two user passwords are identical to each other, the user authentication is determined to have been successfully performed. If, on the other hand, the two user passwords are not identical, the user authentication is determined to have failed (S24).

If the user authentication has been successfully performed, the AAA server 2 generates the access-accept message and transmits it to the FA 1. If the user authentication has failed, the AAA server 2 generates an access-reject message and transmits it to the FA 1.

A method for generating the access-accept message will now be described. The AAA server 2 puts a value signifying the access-accept message in the code field, and an ID value included in the received access-request message in the ID field. A whole length value of the access-accept message is put in the length field and a value of the authenticator field of the access-request message is put in the authenticator field. The AAA server 2 also puts the attribute values, which is information to be received from the access-accept message, in the attribute field and thus generates the access-accept message.

The AAA server 2 inputs the access-accept message and the shared secret key known between the FA 1 and itself to the MD5 algorithm and executes the MD5 algorithm. As the MD5 algorithm is executed, a 16 byte message digest is created. The message digest is put in the authenticator field of the access-accept message to finally generate an access-accept message. The AAA server 2 then transmits the finally generated access-accept message to the FA 1.

Upon receipt of the access-accept message, the FA 1 determines the ID value of the access-accept message and searches information of the access-request message matched with the access-accept message. The FA 1 then searches an authenticator value of the access-request message.

The FA 1 stores the authenticator value of the access-accept message in a temporary storing area and writes the authenticator value of the access-request message in the authenticator field of the access-accept message. The FA 1 then executes the MD5 algorithm using the access-accept message of which the authenticator field has been newly filled and the shared secret key to be already known between the FA 1 and the AAA server.

Thereafter, the FA 1 compares the 16 byte message digest value, that is, a value obtained by executing the MD5 algorithm, with the temporarily stored authenticator value, to verify the received access-accept message. If the message digest value and the temporarily stored authenticator value are identical to each other, the FA 1 determines that the received access-accept message is verified. If, however, the two values are not identical to each other, the FA 1 determines that the received access-accept message is not verified, discards the message, and transmits the access-accept message back to the AAA server 2.

The related art IMT-2000 system has various problems. For example, after the user password is encrypted using the authenticator value, the FA 1 generates a final access-request message. Thus, when the AAA server 2 receives the access-request message, it decodes the access-request message and verifies the value of the attributes field of the access-request message, that is, the encrypted user password. Consequently, when the access-request message is received, the access-request message must be analyzed to authenticate the user. In addition, authentication is performed only for the user; it is not possible to authenticate the access-request message itself.

Therefore, if a malicious hacker transmits a large quantity of force access-request messages to the AAA server 2, the AAA server 2 must analyze the false access-request message one by one, and performs authentication by using the values of the attribute field. In this case, since the AAA server 2 performs various processes to attempt authentication, such as referring to the database and other resource allocation, the system becomes over-loaded, causing the system to crash.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for processing an access-request message in an IMT-2000 system that is capable of directly verifying an access-request message itself without decoding.

Another object of the present invention is to provide a method for processing an access-request message in an IMT-2000 system that increases a message processing speed.

Another object of the present invention is to provide a method for processing an access-request message in an IMT-2000 system that reduces use of resources for a message processing.

Another object of the present invention is to provide a method for processing an access-request message in an IMT-2000 system that improves the system performance.

Another object of the present invention is to provide a method for processing an access-request message for packet service, including writing a temporary randomly generated authenticator value in an attribute field of an access-request message, encrypting a user password using the temporary authenticator value, executing an encryption algorithm using the access-request message having the temporary authenticator value and the encrypted user password, the access-request message having an authenticator field that is filled with a prescribed value to generate a message digest, generating a final access-request message by replacing the value of the authenticator field with the message digest, transmitting the final access-request message to an Authentication, Authorization and Accounting (AAA) server, and verifying the access-request message by the AAA server.

Another object of the present invention is to provide a method for processing an access-request message for a packet service in a communication system, including writing an authenticator value for authenticating an access-request message in an authenticator field of an access-request message and transmitting an access-request message, verifying the access-request message by using the authenticator value of the access-request message when the access-request message is received, decoding the access-request message if the access-request message is successfully verified, and performing user authentication by decrypting an encrypted user password of the decoded access-request message using a temporary authenticator value of the decoded access-request message and a shared secret key that is known to each of a message transmitter and a message receiver.

To achieve at least the above described objects in whole or in parts, there is provided a method for processing an access-request message in an IMT-2000 system including encrypting a user password by using a temporary authenticator value which is differently created every time a message is generated, creating an authenticator value for authenticating an access-request message by using the temporary authenticator value and a shared secret predetermined between an FA and an AAA server, writing the authenticator value in an authenticator field and generating the access-request message, verifying the access-request message by using the authenticator value of the access-request message by the AAA server when it receives the access-request message, analyzing the access-request message in case that the access-request message is verified, and performing user authentication by decrypting an encrypted user password of the access-request message by using the temporary authenticator value of the analyzed access-request message and a shared secret key to be known between the FA and the AAA server.

To achieve at least the above described objects in whole or in parts, there is further provided a method for processing an access-request message in an IMT-2000 system including writing a temporary authenticator value which is created differently every time a message is generated in an attribute field of an access-request message having an authenticator field and the attribute field, encrypting a user password with the temporary authenticator value, executing an encrypting algorithm by using the access-request message having the temporary authenticator value and the encrypted user password and of which the authenticator field is filled with a pre-set specific value, and taking a message digest, that is, a value resulted from executing the encrypting algorithm, as an authenticator value; filling the authenticator value in the authenticator field, generating a final access-request message and transmitting the final access-request message to the AAA (Authentication, Authorization and Accounting) server, and verifying the access-request message by the AAA server.

To achieve at least the above described objects in whole or in parts, there is further provided a method for processing an access-request message in an IMT-2000 system including writing an authenticator value for authenticating an access-request message in an authenticator field and transmitting an access-request message, verifying the access-request message by using the authenticator value of the access-request message in case that the access-request message is received, decoding the access-request message in case that the access-request message is verified, and decrypting an encrypted user password of the decode access-request message by using a temporary authenticator value of the decoded access-request message and a shared secret key to be known between the FA and the AAA server, and performing user authentication.

To achieve at least the above described objects in whole or in parts, there is further provided a method of processing an access-request message, comprising receiving an access-request message having a code field, an identifier field, a length field, and authenticator value, and at least one attribute field, the authenticator value being a message digest created by encrypting a temporary access-request message, and the at least one attribute field including an encrypted user password, processing the authenticator value to determine if the access-request message is a valid access-request message or an abnormal access-request message, and performing user authentication if it is determined that the access-request message is a valid access-request message and discarding the access-request message if it is determined that the access-request message is abnormal.

To achieve at least the above described objects in whole or in parts, there is further provided an access-request message, comprising a code field to indicate that a message is an access-request message, an identifier field to identify an access-accept message corresponding to the access-request message, a length field to identify a length of the access-request message, an authenticator value including user authentication information and message authentication information, a temporary authenticator field; and an encrypted user password, wherein the authenticator value comprises a 16 byte message digest resulting from performing a prescribed encryption algorithm using a temporary access-request message containing the temporary authenticator and a known authenticator value that is pre-defined between a message origination point and a message destination point.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
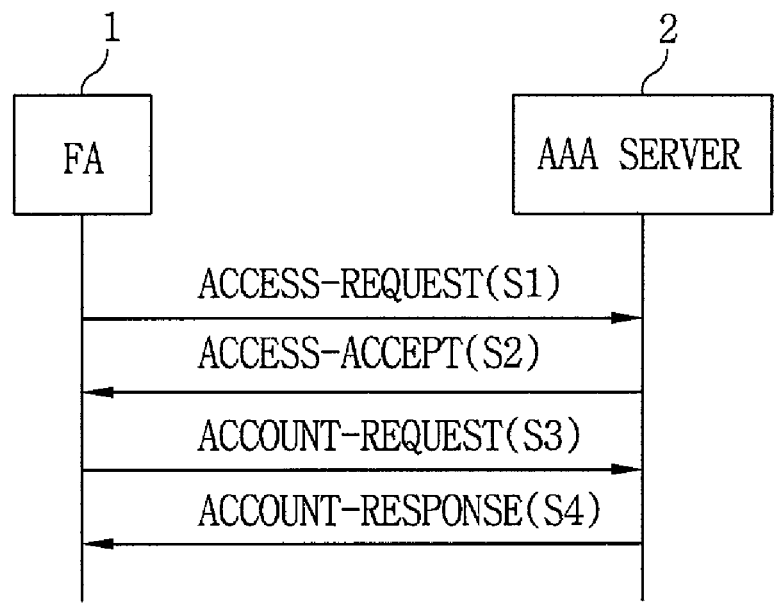
FIG. 1 illustrates a related art method of transmitting and receiving of a RADIUS protocol message between an FA and an AAA server in an IMT-2000 system.
Figure 2:
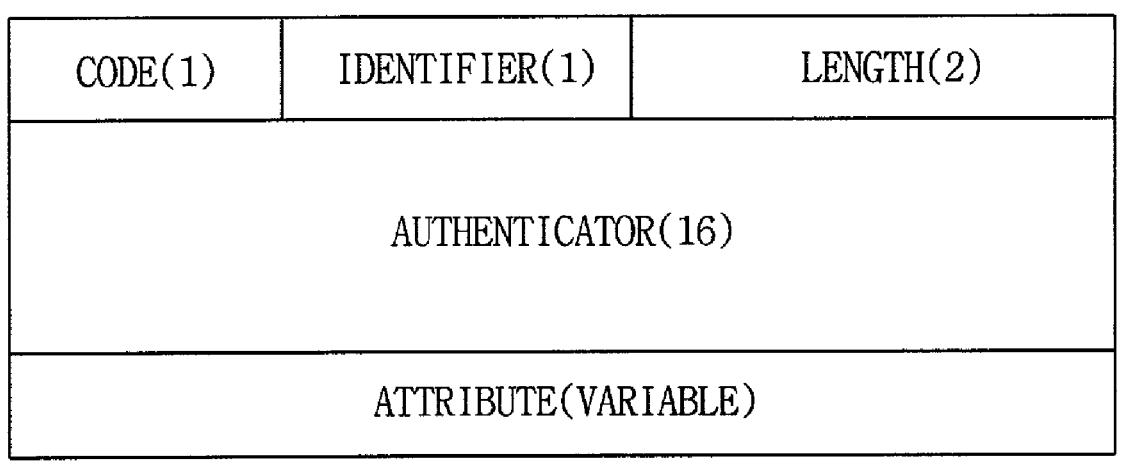
FIG. 2 illustrates a structure showing a format of a RADIUS message.
Figure 3:
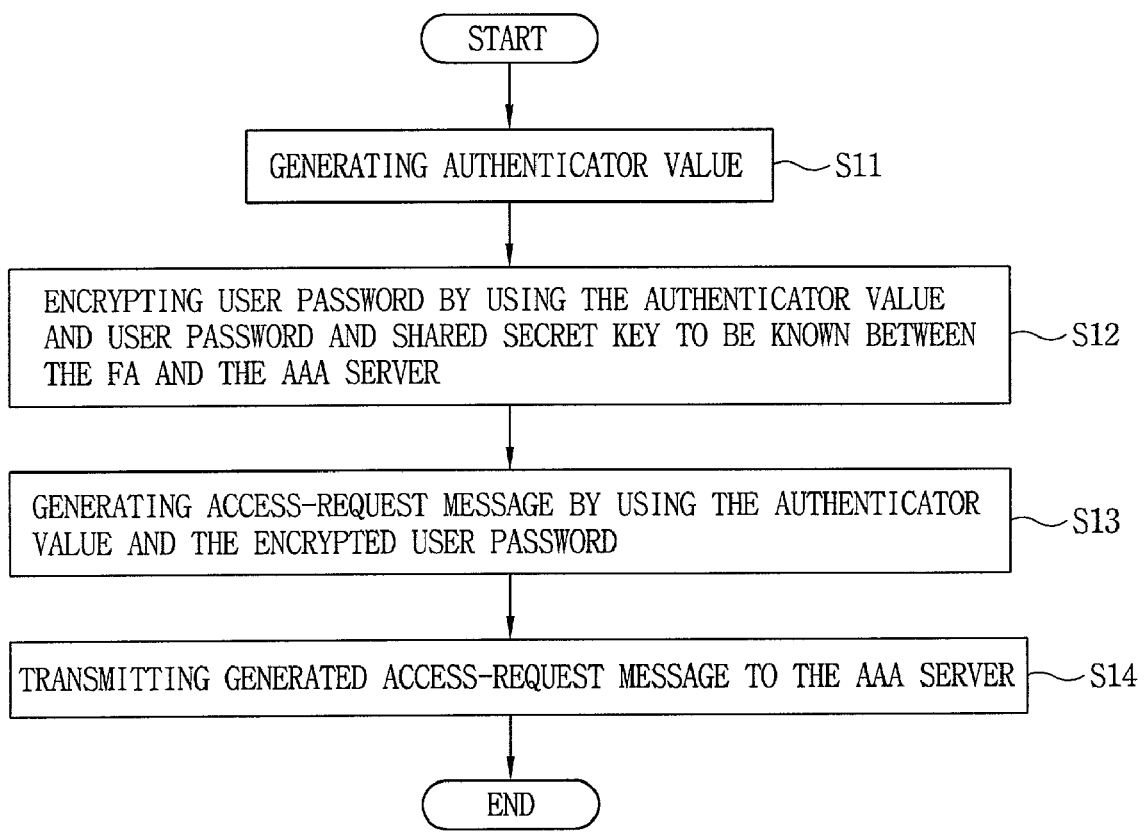
FIG. 3 is a flow chart illustrating a related art method for generating an access-request message by the FA in the IMT-2000 system.
Figure 4:
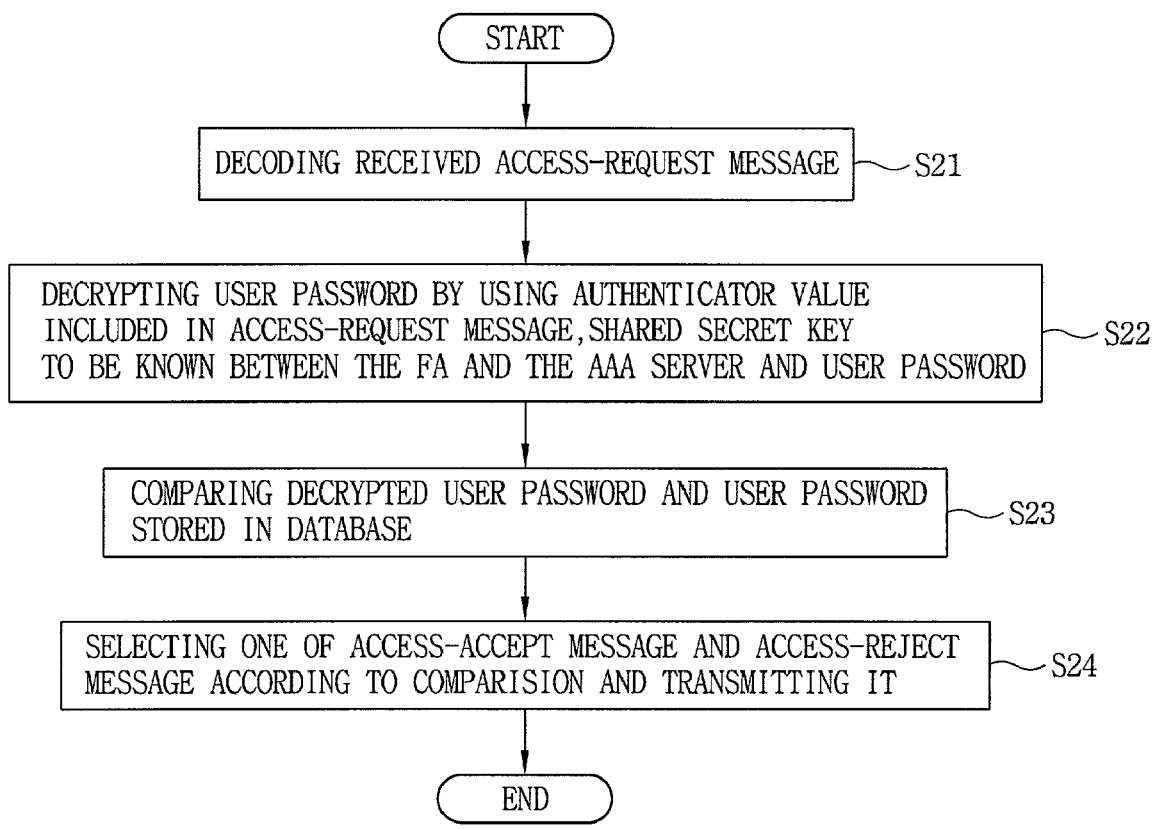
FIG. 4 is a flow chart illustrating a related art method for processing the access-request message received by the AAA server of the IMT-2000 system.
Figure 5:
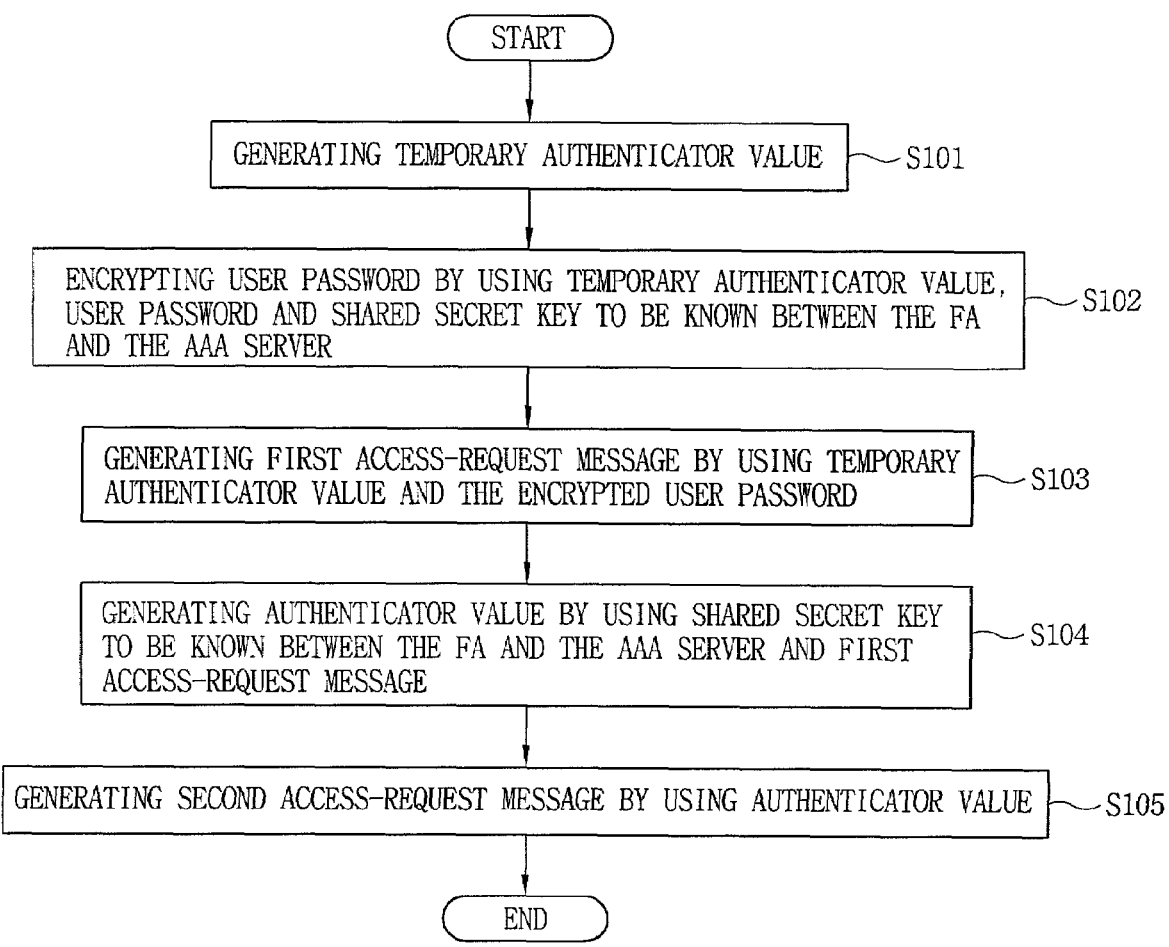
FIG. 5 is a flow chart illustrating a method for generating an access-request message in an IMT-2000 system in accordance with a preferred embodiment of the present invention.

FIG. 5 is a flow chart illustrating a method for generating an access-request message in an IMT-2000 system in accordance with the preferred embodiment. As shown in the drawing, a FA 1 generates an arbitrary 16 byte value and takes it as a temporary authenticator value (S101). The FA 1 inputs the shared secret key to be known between the FA 1 and the AAA server 2 to the MD5 algorithm and executes an MD5 algorithm to encrypt the user password (S102).

Thereafter, the FA 1 generates a first access-request message by using the temporary authenticator value and the encrypted user password (S103).

Figure 6:
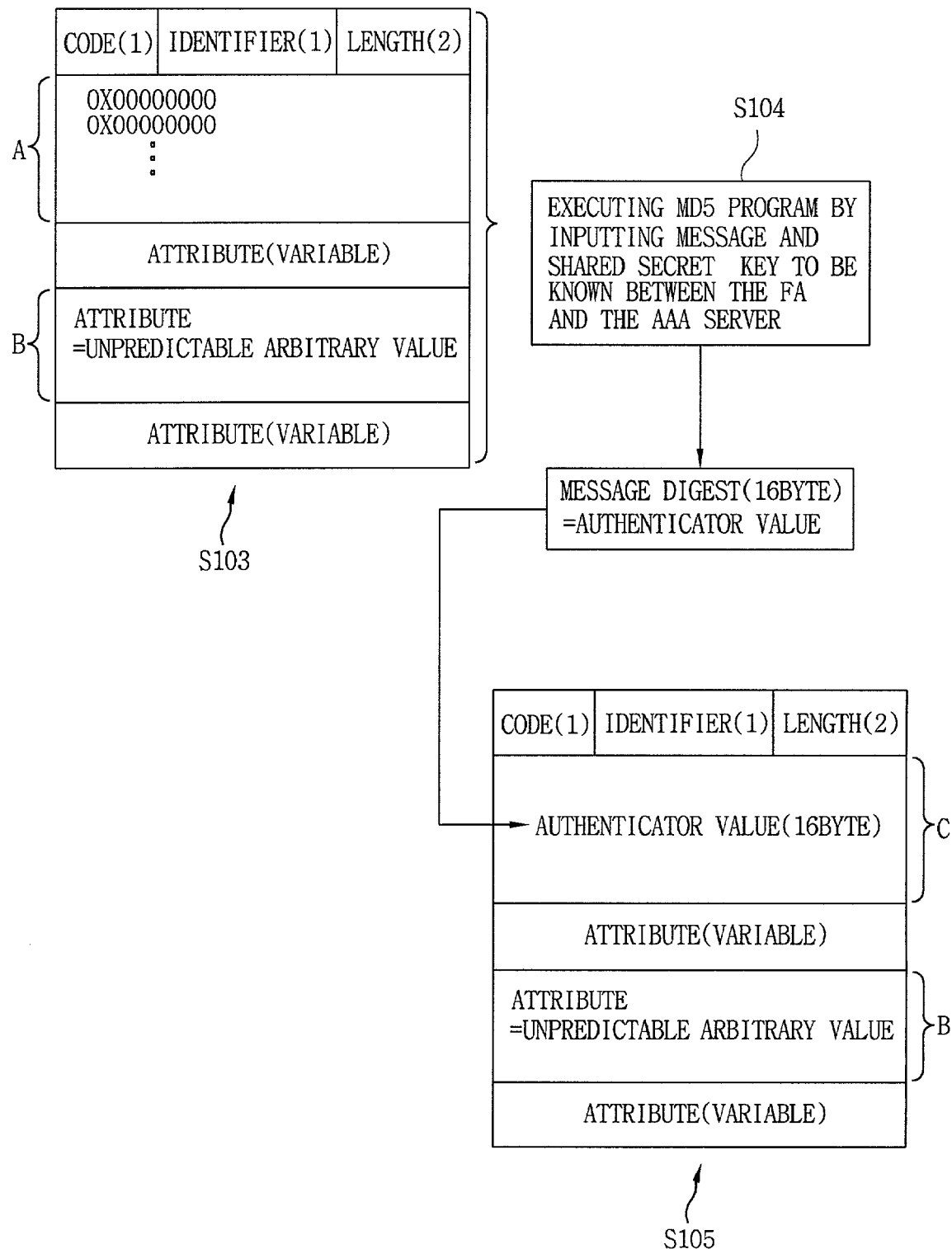
FIG. 6 illustrates a structure showing an access-request message format in accordance with the preferred embodiment of the present invention.

This is described in more detail, as shown in FIG. 6. The FA 1 thus puts a value indicating an access-request message in the code field, an arbitrary value for identifying an access-accept message, that is, a response message, in an ID field, and an overall length value of the access-request message in the length field. The FA 1 puts a specific value predefined between the FA 1 and the AAA server 2 (for example, value '0') in the whole 16 byte of an authenticator field 'A', the temporary authenticator value in an attribute field 'B', the encrypted user password in a different attribute field, and other information in a different attribute field, thereby generating the first access-request message (S103).

The FA 1 then executes the MD5 algorithm using the first access-request message and the shared secret key known between the FA 1 and the AAA server 2. From this, it takes a 16 byte message digest, that is, a value resulting from the execution of the MD5 algorithm, as an authenticator value (S104).

The FA 1 writes the generated authenticator value in the authenticator field 'C' of the first access-accept message, and finally generates a second access-request message (S105).

Figure 7:
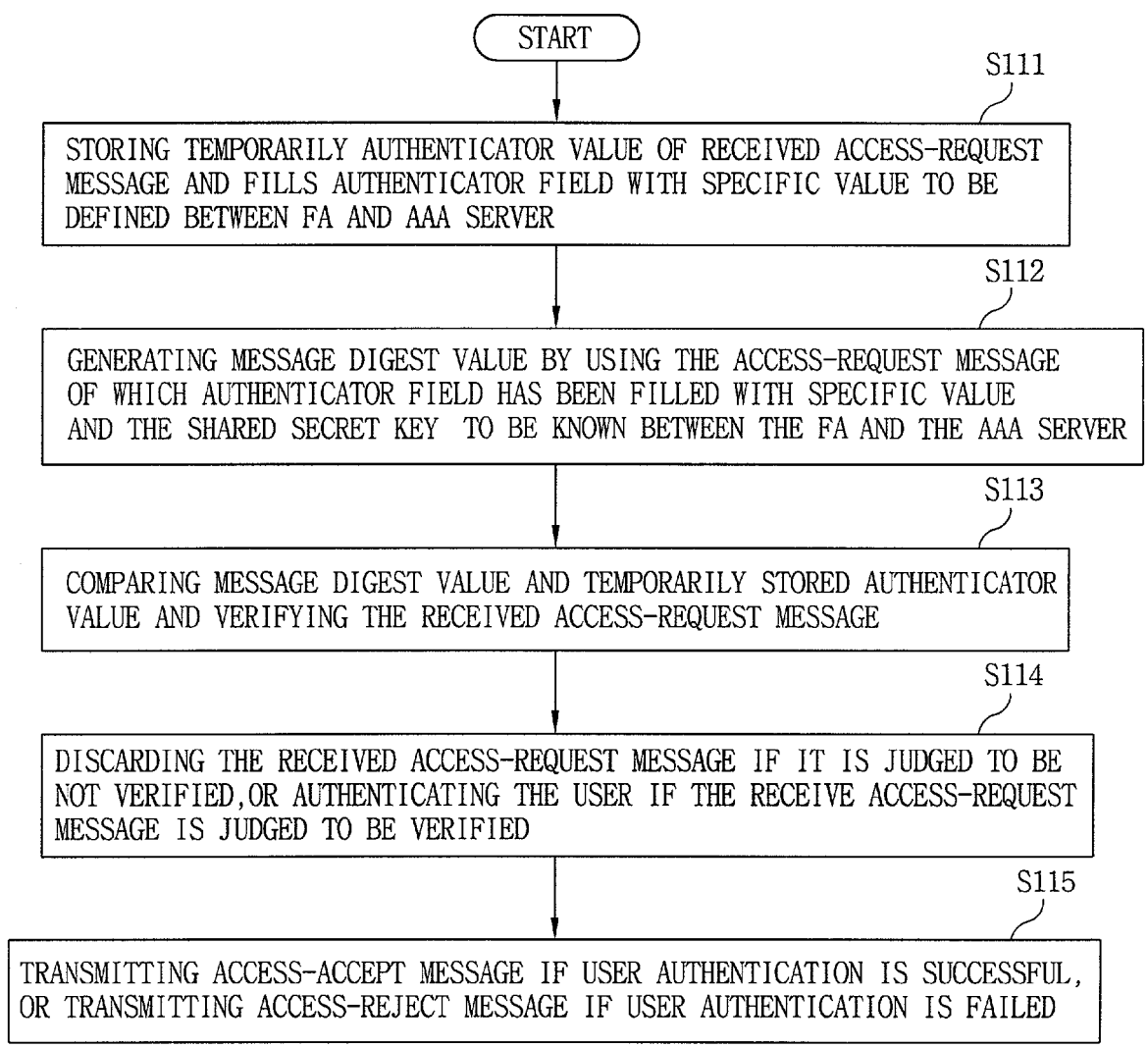
FIG. 7 is a flow chart illustrating a method for processing the access-request message in an IMT-2000 system in accordance with the preferred embodiment of the present invention.

FIG. 7 illustrates a method for processing the access-request message in the IMT-2000 system in accordance with the preferred embodiment. As shown in the drawing, the AAA server 2 stores the value written in the authenticator field of the received access-request message in a temporary storing area and puts the specific value predefined between the FA 1 and the AAA server 2 (for example, '0') in the authenticator field (S111).

The AAA server 2 inputs the access-request message of which the authenticator field is filled with '0' and the shared secret key to be known between the FA 1 and the AAA server 2 to the MD5 algorithm and executes the MD5 algorithm to generate a 16 byte digest (S112). The AAA server 2 then compares the 16 byte message digest with the temporarily stored authenticator value to verify the received access-request message (S113).

Upon comparison, if the message digest and the temporarily stored authenticator value are not identical to each other, the AAA server 2 determines that the received access-request message is abnormal and discards the access-request message. If, however, the message digest and the temporarily stored authenticator value are identical, the AAA server 2 determines that the received access-request message is verified, and performs user authentication (S114). That is, the AAA server 2 inputs the encrypted user password of the received access-request message, the temporary authenticator value, and the shared secret key known between the FA 1 and the AAA server 2 to the MD5 algorithm and executes the MD5 algorithm.

According to execution of the MD5 algorithm, the AAA server 2 obtains the decrypted 16 byte user password. The AAA server 2 compares the decrypted user password and a password of the corresponding user stored in the database. Upon comparison, if the two passwords are identical to each other, the AAA server 2 determines that the user authentication has been successfully performed. If, on the other hand, the two passwords are not identical, the AAA server 2 determines that the user authentication has failed.

If the user authentication has been successfully performed, the AAA server 2 generates an access-accept message and transmits it to the FA 1. Meanwhile, if the user authentication has failed, the AAA server 2 generates an access-reject message and transmits it to the FA 1 (S115).

A method for generating the access-accept message and a method for generating the access-reject message are performed in the same manner as in the related art. The descriptions of these processes are thus omitted.

As state above, in the method for processing an access-request message in a packet service in accordance with the preferred embodiment, a user password is encrypted using an arbitrary value which is created differently every time a message is generated. An authenticator is generated using a Code, an ID, a Length, a temporary authenticator filled with the specific value predefined between the FA and the AAA server, the arbitrary value, and the encrypted user password to thereby generate an access-request message. In this way, the AAA server can directly verify the message itself without decoding the access-request message when it receives the access-request message.

Generally, an Internet Protocol (IP) network for supporting the packet data service adopts a simple IP and a mobile IP. An authentication method of the IP network following the simple IP includes a Password Authentication Protocol (PAP) method and a Challenge Handshake Authentication Protocol (CHAP) method.

In the PAP method, when a user transmits a user ID and a user password to the FA, the FA encrypts the user password and transmits an access-request message to the AAA server, requesting a user authentication. A connection is set up or cut off according to the user authentication. This method is featured in that the user password is transmitted to the FA without a security procedure and is encrypted to be transmitted between the FA and the AAA server.

The CHAP method is directed to a more stable system connection compared with the PAP method. The FA transmits an arbitrary value to a user, and the user generates a uni-directional hash function value for the arbitrary value and transmits the uni-directional hash function value to the FA. The FA transmits an access-request message to the AAA server, including the arbitrary value and the uni-directional hash function value. The AAA server generates an uni-directional hash function value for the transmitted arbitrary value. The AAA server compares the received hash value with a hash value calculated by itself to perform user authentication. If the authentication is successfully performed, the server proceeds to the following procedure, while if the authentication fails, the server terminates the connection.

The authentication method in the IP network following the mobile IP is performed in the same manner as that of the CHAP.

The preferred embodiment is adaptable to both the simple IP and the mobile IP. When applied to the PAP method of the simple IP method, a new attribute field is prepared to which a temporary authenticator value is written. Alternatively, when applied to the CHAP method, a temporary authenticator value is written in the already prepared CHAP_CHALLENGE attribute field.

The present invention and the preferred embodiment have many advantages. For example, the user password is encrypted by the temporary authenticator value and an authenticator value which is able to verify an access-request message itself is generated, so that when the AAA server receives the access-request message, it can directly verify the access-request message without analyzing the received access-request message.

Therefore, even if a malicious hacker transmits a large quantity of false access-request messages to the AAA server, the use of the system resource and the message processing time are reduced, and the system is thus prevented from crashing and the system performance is consequently improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for processing an access-request message for packet service, comprising:
    writing a temporary randomly generated authenticator value in an attribute field of an access-request message;
    encrypting a user password using the temporary authenticator value;
    executing an encryption algorithm using the access-request message having the temporary authenticator value and the encrypted user password to generate a message digest, the access-request message having an authenticator field that is filled with a prescribed value;
    generating a final access-request message, the final access-request message being generated by using the access-request message and replacing the value of the authenticator field with the message digest;
    transmitting the final access-request message to an Authentication, Authorization and Accounting (AAA) server; and
    verifying the final access-request message by the AAA server using the prescribed value,
    wherein the prescribed value is a value previously defined between a foreign agent and the AAA server.

2. The method of claim 1, wherein verifying the final access-request message comprises:
    temporarily storing the value of the authenticator field of the final access-request message;
    filling the authenticator field with the prescribed value;
    performing an encrypting algorithm to obtain a second message digest; and
    verifying the access-request message by comparing the temporarily stored value of the authenticator field to the second message digest.

3. The method of claim 2, wherein verifying the final access-request message further comprises:
    determining the final access-request message to be normal if the temporarily stored authenticator value and the second message digest are identical to each other; and
    determining the final access-request message to be abnormal if the temporarily stored authenticator value and the second message digest are not identical to each other.

4. The method of claim 3, further comprising:
    processing the final access-request message if the final access-request message is normal; and
    performing a user authentication by decrypting the encrypted user password written in the attribute field of the processed final access-request message.

5. The method of claim 4, wherein performing the user authentication comprises:
    decrypting the encrypted user password written in the attribute field of the final access-request message using the temporary authenticator value of the final access-request message;
    comparing the decrypted user password with the user password stored in a data base;
    determining the user authentication to be successful if the decrypted user password and the stored user password are identical to each other; and
    determining the user authentication to have failed if the decrypted user password and the stored user password are not identical to each other.

6. The method of claim 3, further comprising discarding the final access-request message if the final access-request message is determined to be abnormal.

7. The method of claim 1, wherein the randomly generated authenticator value is randomly generated every time a message is generated.

8. A method for processing an access-request message for a packet service in a communication system, comprising:
    writing an authenticator value for authenticating an access-request message in an authenticator field of an access-request message and transmitting an access-request message;
    verifying the access-request message by using the authenticator value of the access-request message when the access-request message is received;
    processing the access-request message if the access-request message is successfully verified; and
    performing user authentication by decrypting an encrypted user password of the processed access-request message using a temporary authenticator value of the processed access-request message and a shared secret key that is known to each of a message transmitter and a message receiver.

9. The method of claim 8, wherein verifying the access-request message comprises:
    temporarily storing the authenticator value written in the authenticator field of the received access-request message;
    replacing the authenticator value with a prescribed value in the authenticator field, the prescribed value being previously defined between the message transmitter and the message receiver to form a verification access-request message;
    performing an encrypting algorithm using the verification access-request message and the shared secret key to form a message digest; and
    comparing the message digest with the temporarily stored authenticator value, wherein the access-request message is verified if the message digest and the authenticator value are identical to each other, and wherein the access-request message is abnormal if the message digest and the authenticator value are not identical to each other.

10. The method of claim 8, wherein performing user authentication comprises:
    decrypting the encrypted user password written in an attribute field of the processed access-request message using the temporary authenticator value of the processed access-request message;
    comparing the decrypted user password and a user password stored in a database;
    determining that the user authentication is successful if the decrypted user password and the stored user password are identical to each other; and
    determining that the user authentication has failed if the decrypted user password and the stored user password are not identical to each other.

11. The method of claim 8, wherein transmitting the access-request message comprises:
    encrypting a user password using the temporary authenticator value;
    creating the authenticator value for authentication of the access-request message using the temporary authenticator value and a prescribed value previously defined between the message transmitter and the message receiver; and
    writing the authenticator value in the authenticator field and generating the access-request message.

12. The method of claim 11, wherein encrypting the user password comprises:
generating an arbitrary value which is arbitrarily created each time a message. is generated as a temporary authenticator value;
writing the temporary authenticator value in the attribute field of the access-request message; and
encrypting the user password using the temporary authenticator value and the shared secret key.

13. The method of claim 11, wherein generating the authenticator value comprises:
forming the access-request message by filling attribute fields of the access-request message with the temporary authenticator value and the encrypted user password, and filling the authenticator field with the prescribed value;
executing an encryption algorithm using the generated access-request message and the shared secret key to form a message digest; and
taking the message digest as the authenticator value.

14. The method of claim 11, wherein the temporary authenticator value is randomly generated each time a new access-request message is generated, such that the temporary authenticator value is not known beforehand.

15. The method of claim 8, wherein the message transmitter is a Foreign Agent (FA) and wherein the message receiver is an Authentication, Authorization, and Accounting (AAA) server.

16. A method of processing an access-request message, comprising:
receiving an access-request message having a code field, an identifier field, a length field, and authenticator value, and at least one attribute field, the authenticator value being a message digest created by encrypting a temporary access-request message, and the at least one attribute field including an encrypted user password;
processing the authenticator value to determine if the access-request message is a valid access-request message or an abnormal access-request message; and
performing user authentication if it is determined that the access-request message is a valid access-request message and discarding the access-request message if it is determined that the access-request message is abnormal.

17. The method of claim 16, wherein the access-request message is formed by writing a temporary randomly generated authenticator value in a first attribute field of a temporary access-request message, writing a prescribed value into an authenticator field of the temporary access-request message and writing the encrypted password into a second attribute field, encrypting the user password using the temporary authenticator value, executing an encryption algorithm on the temporary access-request message to form a message digest, replacing the temporary authenticator value of the temporary access-request message with the message digest to form the access-request message.

18. The method of claim 16, wherein processing the authenticator value comprises:
temporarily storing the authenticator value written in the authenticator field of the received access-request message;
replacing the authenticator value with a prescribed value in the authenticator field to form a verification access-request message, the prescribed value being previously defined between the message transmitter and the message receiver;
performing an encrypting algorithm using the verification access-request message and a shared secret key to form a message digest; and
comparing the message digest with the temporarily stored authenticator value, wherein the access-request message is verified if the message digest and the authenticator value are identical to each other, and wherein the access-request message is abnormal if the message digest and the authenticator value are not identical to each other.

19. An improved method of processing an access-request message at a message receiving point, the improvement comprising authenticating the access-request message prior to performing user authentication of the access-request message such that abnormal access-request messages are not processed for user authentication,
wherein authenticating the access-request message comprises:
temporarily storing contents of an authenticator field of the access-request message;
filling the authenticator field with a prescribed value known to each of a message origination point and the message receiving point to form a temporary access-request message;
performing an encrypting algorithm on the temporary access-request message to obtain a message digest; and
verifying the access-request message by comparing the temporarily stored authenticator value to the message digest.

20. The improvement of claim 19, wherein verifying the access-request message comprises determining the access-request message to be normal if the authenticator value and the message digest are identical to each other, and determining the access-request message to be abnormal if the authenticator value and the message digest are not identical to each other.

21. The method of claim 20, wherein if the access-request message is determined to be abnormal based on the authentication procedure, the access-request message is discarded, and wherein if the access-request message is determined to be normal, the message is processed for user authentication.

* * * * *